United States Patent [19]

Brandt et al.

[11] Patent Number: 4,633,901
[45] Date of Patent: Jan. 6, 1987

[54] PRESSURE REGULATOR

[75] Inventors: Timothy B. Brandt; Erwin W. Parr, both of Des Moines, Iowa

[73] Assignee: Parr Manufacturing, Inc., Des Moines, Iowa

[21] Appl. No.: 847,958

[22] Filed: Apr. 3, 1986

[51] Int. Cl.$^4$ .............................................. F16K 15/00
[52] U.S. Cl. .................................... 137/510; 123/463; 123/510; 251/86
[58] Field of Search ................. 137/510; 123/459, 463, 123/510, 514; 251/86

[56] References Cited

U.S. PATENT DOCUMENTS

| 2,326,825 | 8/1943 | Bucknam | 137/510 X |
| 3,193,184 | 7/1965 | Hopper | 137/510 X |
| 4,312,374 | 1/1982 | Drori | 137/510 X |

Primary Examiner—Harold W. Weakley
Attorney, Agent, or Firm—Henderson & Sturm

[57] ABSTRACT

A pressure regulator having a housing with a chamber disposed therein. A diaphragm is sealingly connected around the inner periphery of the housing for dividing the chamber into two parts. A first port is fluidly connected to a first part of the chamber and is adapted to be attached to a fuel return line. A second port is fluidly connected to the first part of the chamber and is adapted to be fluidly attached to a fuel rail having fuel injectors attached thereto. A third port is fluidly connected to the second part of the chamber and is adapted to be fluidly connected to an intake manifold of an internal combustion engine. A resilient flat washer is attached around the outer periphery thereof to the housing, adjacent to the first part. An elongated valve member is disposed in the first part of the chamber and has one end thereof adapted to be selectively and sealingly received within the opening in the washer. The other end of the elongated valve member is attached by a universal joint to a central portion of the diaphragm. A guide is disposed in the first part of the chamber around the elongated valve member for guiding the valve member into and out from sealing engagement with the washer. A stop is provided also in the guide for limiting of the movement of the diaphragm in one direction thereof to a first position wherein the first part is closed by having the elongated valve member disposed into the opening in the washer. A compression spring in the second part of the chamber is provided for biasing the diaphragm and the elongated valve member to the first position thereof and allowing them to move to a second position thereof to open the valve.

2 Claims, 4 Drawing Figures

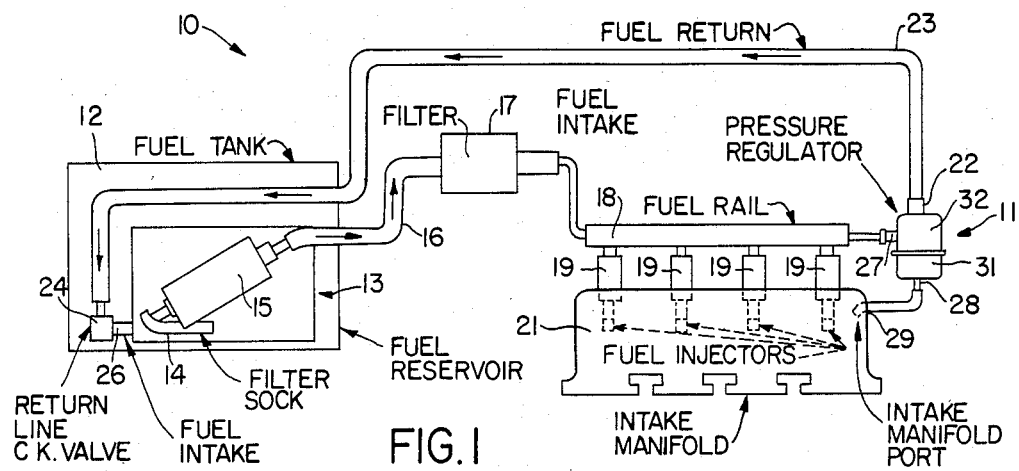
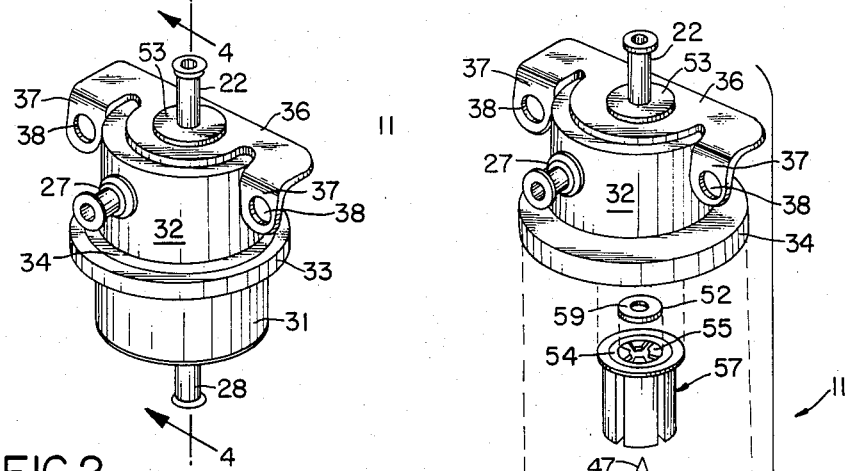
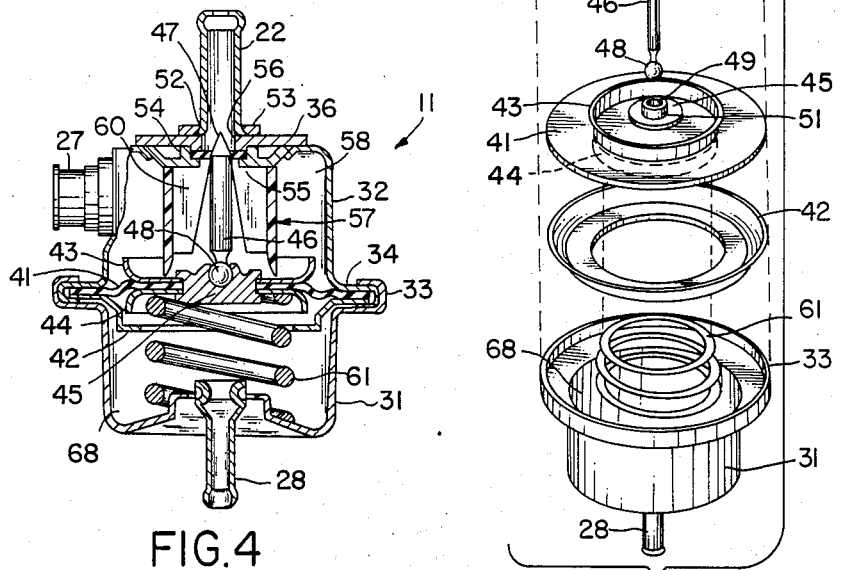
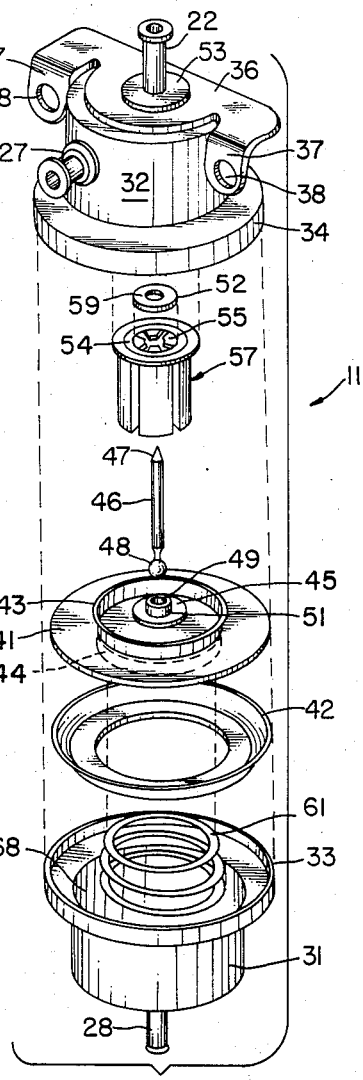

4,633,901

PRESSURE REGULATOR

TECHNICAL FIELD

The present invention relates to pressure regulators, and more particularly to a pressure regulator for internal combustion engines having fuel injector valves.

BACKGROUND ART

One fuel injection system for internal combustion engines includes a fuel rail having filtered fuel under pressure entering it from a fuel tank. The fuel rail has fuel injectors connected thereto and the fuel injectors connect on the other end thereof to an intake manifold. A pressure regulator is connected between the fuel rail and the intake manifold to drain excess fuel in the fuel rail, through a fuel return line, back to the fuel tank when a differential pressure between the fuel rail and the intake manifold (i.e. the differential pressure across the fuel injectors,) is at a predetermined differential pressure. If the predetermined differential pressure is maintained, the internal combustion engine will function properly and if this predetermined differential pressure is not maintained, the engine will not function properly.

One prior art pressure regulator is disclosed in U.S. Pat. No. 4,327,767 to Fehrenbach et al. While this pressure regulator is adequate to do the aforementioned job, it is unduly complex, which causes reliability problems and also increases the manufacturing costs of the device.

DISCLOSURE OF THE INVENTION

The present invention relates to a pressure regulator having a housing with a chamber disposed therein. A diaphragm is sealingly connected around the inner periphery of the housing for dividing the chamber into two parts. A first port is fluidly connected to a first part of the chamber and is adapted to be attached to a fuel return line. A second port is fluidly connected to the first part of the chamber and is adapted to be fluidly attached to a fuel rail having fuel injectors attached thereto. A third port is fluidly connected to the second part of the chamber and is adapted to be fluidly connected to an intake manifold of an internal combustion engine.

A resilient flat washer is attached around the outer periphery thereof to the housing adjacent to the first part. An elongated valve member is disposed in the first part of the chamber and has one end thereof adapted to be selectively and sealingly received within the opening in the washer. The other end of the elongated valve member is attached by a universal joint to a central portion of the diaphragm. A guide is disposed in the first part of the chamber around the elongated valve member for guiding the valve member into and out from sealing engagement with the washer. A stop is provided also in the guide for limiting of the movement of the diaphragm in one direction thereof to a first position wherein the first part is closed by having the elongated valve member disposed into the opening in the washer. A compression spring in the second part of the chamber is provided for biasing the diaphragm and the elongated valve member to the first position thereof, but allowing the diaphragm and elongated member to move to a second position thereof whereby one end of the elongated valve member is not in the opening of the washer to thereby permit flow between the first part of the chamber and the fuel return line when relative differential pressure conditions on each side of the diaphragm, in conjunction with the biasing force of the spring, force the diaphragm to the second position thereof.

An object of the present invention is to provide an improved pressure regulator for the fuel system of an internal combustion engine.

Another object of the present invention is to provide a pressure regulator of the aforementioned type which responds to a differential pressure between the upstream and downstream side of the fuel injectors for an internal combustion engine and which will selectively allow excess fuel from the fuel rail to return through a fuel line to the fuel tank when under certain differential pressure conditions.

Other objects, advantages, and novel features of the present invention will become apparent from the following detail description of the invention when considered in conjunction with the accompanying drawings.

BRIEF DESCRIPTION OF THE DRAWINGS

FIG. 1 is a schematic view of a fuel delivery system of a type having fuel injectors for use in an internal combustion engine and having an improved pressure regulator attached into the system;

FIG. 2 is a perspective view of a pressure regulator constructed in accordance with the present invention;

FIG. 3 is an exploded view showing the parts of the preferred embodiment of the invention shown in FIG. 2; and FIG. 4 is a cross sectional view taken along line 4—4 of FIG. 2.

BEST MODE FOR CARRYING OUT THE INVENTION

Referring now to the drawings wherein like reference numerals designate identical or corresponding parts throughout the several views, FIG. 1 shows a fuel delivery system (10) having a pressure regulator (11) constructed in accordance with the present invention connected to the system. A fuel tank (12) having a fuel reservoir (13) disposed therein is provided for providing a supply of fuel, such as gasoline, to an internal combustion engine (not shown). A filter sock (14) and a fuel pump (15) are disposed within the fuel reservoir (13) for delivering fuel, under pressure to the delivery line (16). A filter (17) is provided within the delivery line (16) for filtering impurities from the fuel. A fuel rail (18) is attached in fluid communication with the delivery line (16) for feeding fuel to fuel injectors (19).

The fuel injector valves (19) are connected at the other end thereof to an intake manifold (21) for ultimate distribution to the pistons of an internal combustion engine. The pressure regulator (11) has a first port (22) fluidly connected to a fuel return line, through a one way return line check valve (24) which allows the fuel to flow from the fuel return line into the fuel reservoir (13), but will now allow flow in an opposite direction, and through a fuel intake line (26).

A second port (27) is fluidly connected to the fuel rail (18), as can best be seen in FIG. 1. A third port (28) is fluidly attached to an intake manifold port (29) of the intake manifold (21).

Referring to FIG. 2, the pressure regulator (11) is shown having a housing including portions (31) and (32) which are connected together by having a portion (33) of portion (31) crimped around a flange (34) on the portion (32). A bracket (36) having flanges (37) with openings (38) disposed therein is provided for being able to mount the pressure regulator (11) on a vehicle or vehicle engine.

Referring to FIGS. 3 and 4, it is noted that a flexible diaphragm (41) is sealingly clamped at the outer edges thereof by the joinder of flange (33) and flange (34). A metal backing ring (42) also has the outer periphery thereof clamped to this joint.

The flexible diaphragm (41) has a pair of plates (43) and (44) attached thereto by a central member (45), made of metal or the like. A needle valve member (46) having a conical portion (47) on one end thereof and a ball (48) on the other end thereof is positioned within an opening (49) centrally of one side of the member (45) and thereafter flanges (51) are clamped over the ball (48), for example as shown in FIG. 4, whereby the elongated valve member (46) forms somewhat of a universal joint with respect to the member (45) so that it will align properly with a sealing ring (52) as will be described below.

The housing bracket (36) is held in place between a washer (53) and a portion (54) of housing portion (32). The resilient rubber or plastic (52) is clamped between a flange (55) connected to housing portion (32) and between an inner peripheral part (56) of bracket (36). A molded plastic member (57) disposed in a first chamber (58) and this member (57) has basically two functions. A first function of the molded member (57) is to utilize the fins (60) thereon to guide the elongated valve member (46) into and out from the opening (59) in the washer (52). A second function of the molded member (57) is to provide a stop between the flanges (55) of member (32) and the flange (43) connected to the diaphragm so that the diaphragm (41) will not be overly stretched when in the position shown in FIG. 4 wherein the predominate forces are tending to force the diaphragm (41) and needle valve (46) upwardly as viewed in FIG. 4.

A conical compression spring (61) is disposed within a second chamber (68) within the housing part (31). This compression spring (61) biases the diaphragm (41) and needle valve (46) to the position shown in FIG. 4.

In operation of the present invention, the fuel delivery system shown in FIG. 1 includes fuel tank (12) and the fuel rail assembly (18) linked together by two separate circuits, which form a closed loop. A fuel supply circuit delivers a constant flow of fuel under pressure from the tank (12) to the fuel rail assembly (18). Since the engine only requires a small portion of the delivered fuel, the remainder of the fuel is returned to the fuel tank (12) by the action of the fuel regulator (11) through the fuel return circuit including fuel return line (23). In this system, there is a generous oversupply of fluid provided in the fuel rail (18). Thus, varying demands on the fuel system encounter little or no inlet pressure variation so that more precise and predictable fuel metering is assured.

The operation of the pressure regulator (11) in the system of FIG. 1 is such that under normal circumstances, the spring (61) will bias the diaphragm (41) and the needle valve (46) to the closed position shown in FIG. 4 wherein the conical end (47) will extend through the opening (59) in the resilient ceiling ring (52). Under these conditions, the port (22) is closed and cut off from the subchamber (58). When there becomes too much fuel in the fuel rail (18), the pressure will build up in the subchamber (58) and this pressure will substantially exceed the pressure in the subchamber (68), which is connected to the intake manifold (21). Consequently, the total pressure forces within the subchamber (58) will at times substantially exceed the combination of forces of the pressure within the subchamber (68) and the force of the compression spring (61); and at such time, the diaphragm (41) will be forced downwardly, as viewed in FIG. 4, to a position wherein there is a space between the conical portion (47) of the valve member (46) and the opening (59) in the washer (52). This will allow excess fuel to exit through the first port (22), to the fuel return line (23) and back to the fuel reservoir (13). As the excess fuel is allowed to return to the fuel tank (12), the pressure in the subchamber (58) will be reduced, and once this pressure is sufficiently reduced, the forces of the spring (61) and the fluid pressure within the subchamber (68) will force the needle valve (46) again to the closed position as shown in FIG. 4.

Obviously many modifications and variations of the present invention are possible in light of the above teachings. It is therefore to be understood that, within the scope of the appended claims, the invention may be practiced otherwise than as specifically described.

I claim:

1. A pressure regulator comprising:

a housing;

means for forming a chamber in said housing;

diaphragm means sealingly connected around the outer periphery thereof to said housing for dividing said chamber into a first and a second subchamber;

a first port fluidly connected to said first subchamber and adapted to be attached to a fuel return line, said first port begin disposed along a longitudinal axis;

a second port fluidly connected to said first subchamber and adapted to be fluidly attached to a fuel rail having fuel injectors attached thereto;

a third port fluidly connected to said second subchamber and adapted to be fluidly connected to an intake manifold;

a resilient flat washer being attached around the outer periphery thereto to said housing, said washer having a circular opening disposed centrally thereof, the axis of said opening being generally coincident with the longitudinal axis of said first port;

an elongated valve member disposed in said first subchamber and having one end thereof adapted to be selectively and sealingly received within said opening in the washer;

universal mounting means for attaching the other end of said elongated valve member to a central portion of said diaphragm means;

guide means disposed in said first subchamber around said elongated valve member for guiding said elongated valve member into the opening of said washer;

stop means integral with said guide means for limiting the movement of said diaphragm means and said elongated valve member in one direction to a first position wherein the first port is closed by having the elongated valve member disposed into the opening in said washer; and spring means in said second subchamber for biasing said diaphragm means and said elongated valve member to said first position thereof but allowing said diaphragm and elongated valve member to move to a second position whereby the one end of the elongated valve member is not in the opening of the washer to thereby permit flow between the first subchamber and the fuel return line when relative differential pressures conditions between the first and second subchambers, in conjunction with the biasing force of said spring means, force the diaphragm means to said second position thereof.

2. The pressure regulator of claim 1 wherein said elongated valve member has a substantially conical portion on said one end thereof.

* * * * *